(12) United States Patent
Ying et al.

(10) Patent No.: US 9,021,563 B2
(45) Date of Patent: Apr. 28, 2015

(54) ACCESSORY INTERFACE SYSTEM

(71) Applicant: HTC Corporation, Taoyuan County (TW)

(72) Inventors: Wen-Ping Ying, Bellevue, WA (US); Chih-Ming Chang, Taoyuan County (TW)

(73) Assignee: HTC Corporation, Taoyuan (TW)

( * ) Notice: Subject to any disclaimer, the term of this patent is extended or adjusted under 35 U.S.C. 154(b) by 39 days.

(21) Appl. No.: 13/733,134

(22) Filed: Jan. 2, 2013

(65) Prior Publication Data

US 2014/0189821 A1    Jul. 3, 2014

(51) Int. Cl.
| | |
|---|---|
| *G06G 7/04* | (2006.01) |
| *H04W 12/04* | (2009.01) |
| *H04W 4/00* | (2009.01) |
| *H04W 84/18* | (2009.01) |

(52) U.S. Cl.
CPC .............. *H04W 12/04* (2013.01); *H04W 4/008* (2013.01); *H04W 84/18* (2013.01)

(58) Field of Classification Search
CPC .... G04B 47/06; G04B 47/061; G04B 47/063; G04B 47/065; G04B 47/066; G04B 47/068; G04G 9/0064
USPC ............................................................ 726/5
See application file for complete search history.

(56) References Cited

U.S. PATENT DOCUMENTS

| | | | |
|---|---|---|---|
| 2003/0025603 A1* | 2/2003 | Smith ........................ 340/572.8 |
| 2004/0010449 A1* | 1/2004 | Berardi et al. .................. 705/16 |
| 2004/0139348 A1* | 7/2004 | Norris, Jr. ...................... 713/200 |
| 2005/0108571 A1* | 5/2005 | Lu et al. ......................... 713/201 |
| 2006/0037066 A1* | 2/2006 | Audebert ........................... 726/5 |
| 2006/0053302 A1* | 3/2006 | Yasaki et al. ................... 713/183 |
| 2007/0043954 A1* | 2/2007 | Fox ................................ 713/185 |
| 2007/0118891 A1* | 5/2007 | Buer ................................. 726/8 |
| 2007/0262134 A1* | 11/2007 | Humphrey et al. ............ 235/379 |
| 2008/0022089 A1* | 1/2008 | Leedom ......................... 713/156 |
| 2008/0065877 A1* | 3/2008 | Son et al. ....................... 713/151 |
| 2008/0169909 A1* | 7/2008 | Park et al. ..................... 340/10.4 |
| 2008/0235144 A1* | 9/2008 | Phillips .......................... 705/67 |
| 2009/0043681 A1* | 2/2009 | Shoji et al. ...................... 705/35 |
| 2009/0126009 A1* | 5/2009 | Arnouse ......................... 726/19 |
| 2009/0143104 A1 | 6/2009 | Loh et al. |
| 2009/0181644 A1* | 7/2009 | Humphrey et al. ............ 455/411 |
| 2009/0210940 A1* | 8/2009 | Dean ............................... 726/19 |
| 2010/0075604 A1* | 3/2010 | Lydon et al. ................. 455/41.3 |
| 2010/0304670 A1* | 12/2010 | Shuo ............................. 455/41.1 |
| 2010/0332833 A1* | 12/2010 | Aissi et al. .................... 713/169 |
| 2011/0126005 A1* | 5/2011 | Carpenter et al. ............ 713/158 |

(Continued)

*Primary Examiner* — Darren B Schwartz
(74) *Attorney, Agent, or Firm* — Jianq Chyun IP Office

(57) ABSTRACT

The accessory is capable of connecting to a host device, which is physically separated from the accessory. The accessory includes a first communication module and a contactless module. The first communication module is used to wirelessly coupled to the host device, and receive a first credential from the host device. The contactless module is coupled to the first communication module. The contactless module includes a controller, a first security element, an antenna, and a storage unit. The controller receives the credential from the first communication module. The first security element is coupled to the controller for receiving and storing the first credential. The antenna is coupled to the controller to wirelessly communicate with a first reader for a first application by using the stored first credential. The storage unit stores at least one first transaction record generated during the first application is operating.

34 Claims, 8 Drawing Sheets

(56) References Cited

U.S. PATENT DOCUMENTS

| | | |
|---|---|---|
| 2011/0145894 A1* | 6/2011 | Garcia Morchon et al. ...... 726/4 |
| 2011/0165896 A1* | 7/2011 | Stromberg et al. ........... 455/466 |
| 2011/0173684 A1* | 7/2011 | Hurry et al. ....................... 726/6 |
| 2012/0030043 A1* | 2/2012 | Ross et al. ...................... 705/16 |
| 2012/0083209 A1* | 4/2012 | Giles et al. .................... 455/41.2 |
| 2012/0084210 A1* | 4/2012 | Farahmand ...................... 705/64 |
| 2012/0137132 A1* | 5/2012 | Le Saint ........................ 713/171 |
| 2012/0317194 A1* | 12/2012 | Tian ............................. 709/204 |
| 2013/0268758 A1* | 10/2013 | Schrecker ...................... 713/168 |
| 2014/0070002 A1* | 3/2014 | Pineau et al. .................. 235/382 |
| 2014/0173692 A1* | 6/2014 | Srinivasan et al. ................ 726/4 |

* cited by examiner

ACCESSORY INTERFACE SYSTEM

BACKGROUND OF THE INVENTION

1. Field of Invention

The present invention generally relates to accessory interface system.

2. Description of Prior Art

In prior arts, user can use an accessory for replacing the traditional ticket or a door key function. But, only one credential is stored in the accessory, and the credential cannot be changed by user. Only one function can be achieved by the accessory at one time. That is, for executing or processing a plurality of different functions, many accessories are needed for the user.

Along with the rapid development of science and technology at the present, a handheld electrical apparatus becomes a useful tool. Nowadays, user can download one or more credentials from at least one security provider to the handheld electrical apparatus (such as a mobile phone). Then, the mobile phone may be a ticket, a wallet and/or a door key for executing or processing a plurality of different functions. But accessory remains single function.

SUMMARY OF THE INVENTION

The present invention provides an accessory, wherein the accessory may be configured for executing different functions.

The present invention provides a system for configuring an accessory of the system to execute a plurality of functions.

The present invention provides a method for configuring an accessory for executing different functions.

The accessory is capable of connecting to a host device, which is physically separated from the accessory. The accessory includes a first communication module and a contactless module. The first communication module is used to wirelessly coupled to the host device, and receive a first credential from the host device. The contactless module is coupled to the first communication module. The contactless module includes a controller, a first security element, an antenna, and a storage unit. The controller receives the credential from the first communication module. The first security element is coupled to the controller for receiving and storing the first credential. The antenna is coupled to the controller to wirelessly communicate with a first reader for a first application by using the stored first credential. The storage unit stores at least one first transaction record generated during the first application is operating.

The system includes a host device and an accessory. The host device includes an application processor, a first storage unit, and a second communication module. The second communication module is coupled to the application processor. Wherein the first storage unit is configured to store a first credential, and the application processor is configured to execute or process a credential management application and an NFC software stack for encapsulating the first credential in a first NFC package format, the NFC software stack includes a smart card API, NFC API, and a controller interface layer. Besides, the accessory is physically separated from the host device, and the accessory includes a first communication module, a first security element, an antenna, and a second storage unit. The first communication module is used for externally connecting to the second communication module of the host device and is used for receiving the encapsulated first credential from the second communication module. The contactless module is coupled to the first communication module and including a controller for receiving the encapsulated first credential from the first communication module. The first security element is coupled to the controller for storing the encapsulated first credential. The antenna coupled to the controller to wirelessly communicate with a first reader for a first application by using the received and stored first credential. The second storage unit is used for storing at least one data such as transaction record generated during the first activity.

The steps of the method includes: providing a host device to coupled to an accessory in a paring mode; transporting a first credential from the external host device to the accessory in the paring mode, and the first credential being received and stored by a first security element; providing a first reader to wirelessly communicate with the accessory for a first application by using the received first credential via an antenna of the accessory in a standalone mode; and, providing a storage unit for storing at least one first transaction record generated during the first activity being operating in the standalone mode.

Accordingly, the accessory provides the first communication module to receive the first credential from the external host device, and the accessory also provides the contactless module to wirelessly communicate with the first reader for operating a first application. The first credential provided by the external host device may be changed and, such as that, a user may use the accessory for many different applications.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1A:
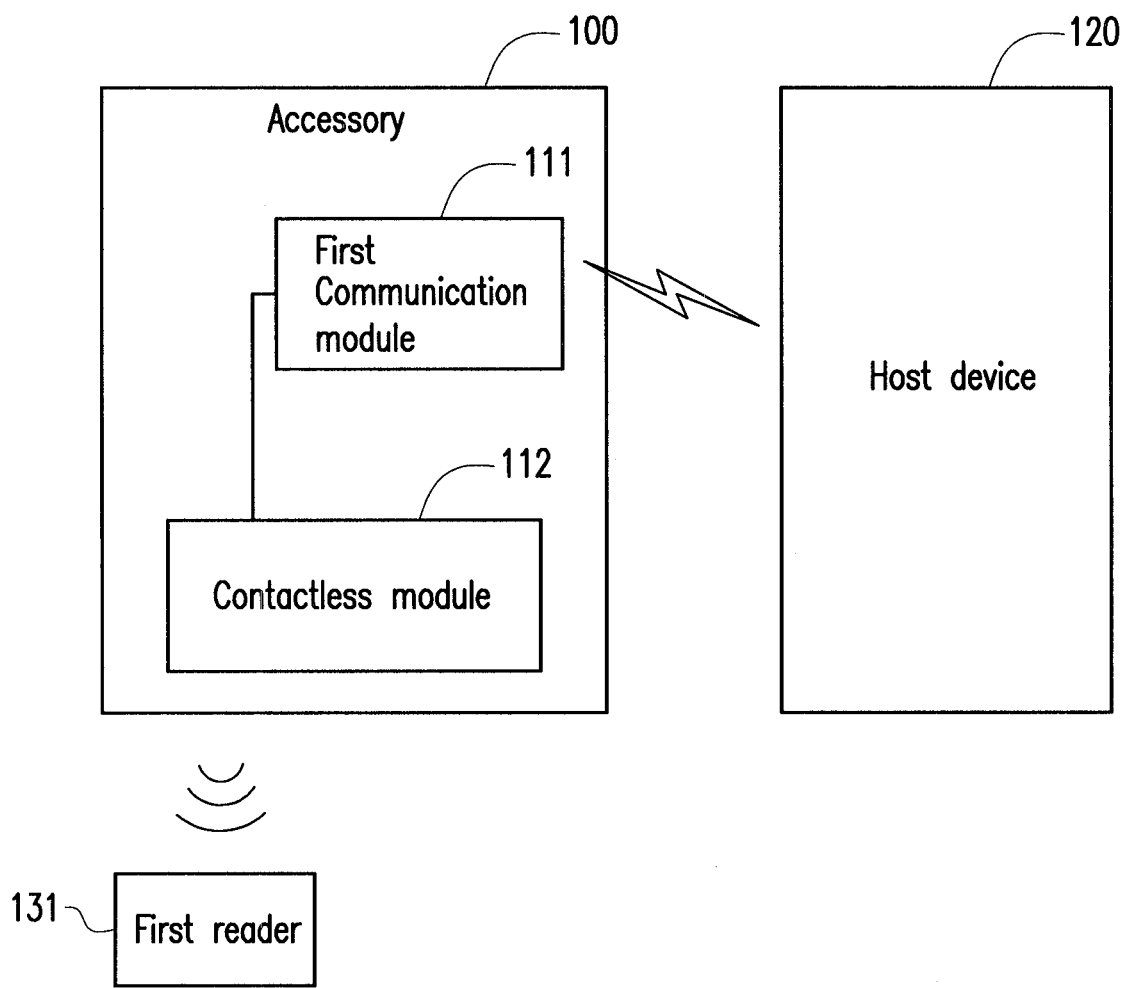
FIG. 1A and FIG. 1B are block diagrams of the accessory 100 according to an embodiment of the present invention.

Reference will now be made in detail to the present preferred embodiment of the invention, examples of which are illustrated in the accompanying drawings. Wherever possible, the same reference numbers are used in the drawings and the description to refer to the same or like parts.

Figure 1B:
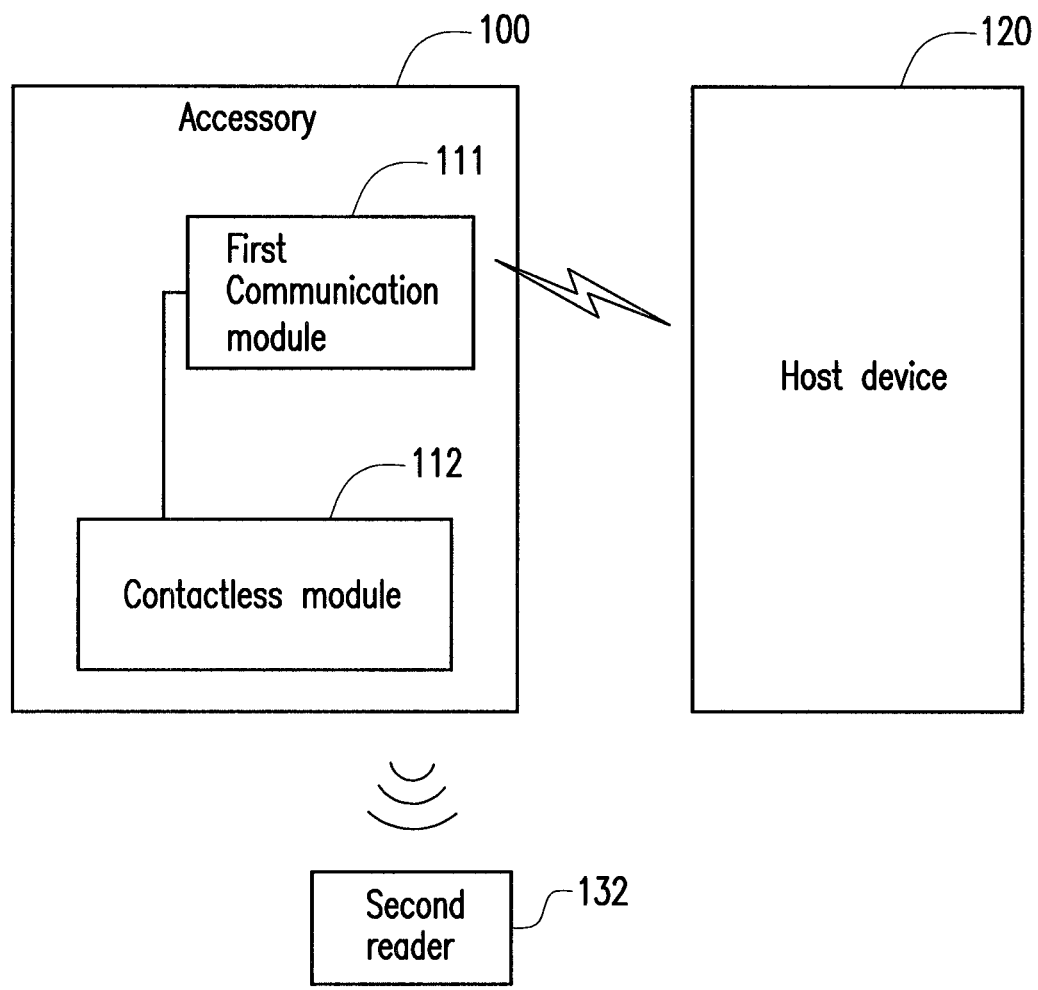

Referring to FIG. 1A and FIG. 1B, FIG. 1A and FIG. 1B are a block diagrams of the accessory 100 according to an embodiment of the present invention. In FIG. 1A, the accessory 100 includes a first communication module 111 and a contactless module 112. The accessory 100 may be in a form of card, wristband, wristwatch, keychain, or jewelry such as ring or necklace. The first communication module 111 wirelessly connects to a host device 120 and receives a first credential from the host device 120. The host device is physically separated from the accessory. The first communication module 111 is coupled to the contactless module 112. After receiving the first credential from the host device 120, the first communication module 111 of the accessory 100 may be wirelessly disconnected to the host device 120, and then the contactless module 112 wirelessly communicates with a first reader 131 for a first activity by at least transmitting information associated with the received first credential to the first reader 131. In this embodiment, the transmitted information associated with the received first credential may be the received first credential itself or information generated based on the received first credential. The first activity may be a first payment transaction or a first security authentication. Besides, in this embodiment, the first communication module 111 is further configured to receive a second credential from the host device 120. Similarly, in FIG. 1B, after the first communication module 111 of the accessory 100 is wirelessly disconnected to the host device 120, the contactless module 112 wirelessly communicates with a second reader 132 for a second activity by at least transmitting information associated with the received second credential to the second reader 132. In this embodiment, the transmitted information associated with the received second credential may be the received second credential itself or information generated based on the received second credential. The second activity is a second payment transaction or a second security authentication.

Please notice here, the first and second credentials may be different, and the first 131 and second reader 132 may be different.

Figure 1C:
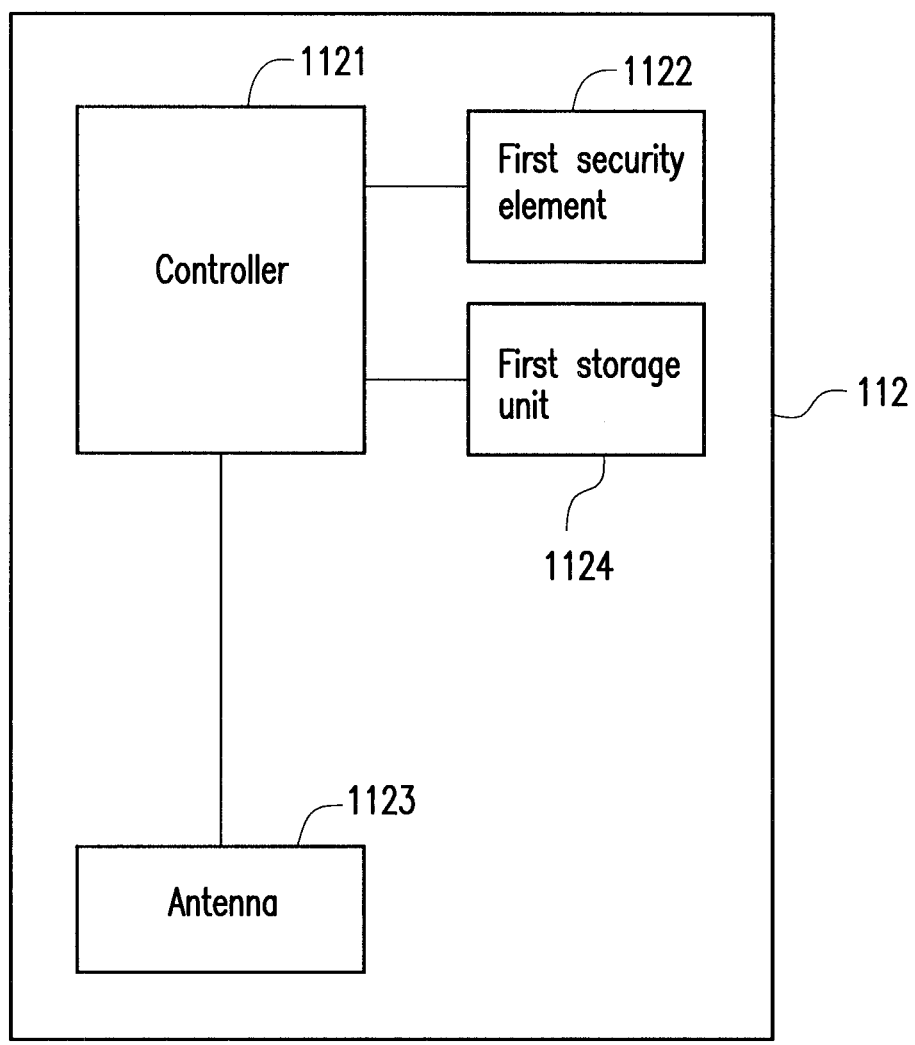
FIG. 1C is a block diagram of the contactless module 112 according to an embodiment of the present invention.

Please refer to FIG. 1C, FIG. 1C is a block diagram of the contactless module 112 according to an embodiment of the present invention. The contactless module 112 includes a controller 1121, a first security element 1122, and an antenna 1123. The contactless module 112 may further comprise a first storage unit 1124. The controller 1121 may be a near field communication controller and may operate in reader/writer mode, card emulation mode, or peer-to-peer mode. The reader/writer mode enables the accessory 100 to read/write data from/to NFC compatible device such as a NFC reader or tags through the use of the contactless module 112. The card emulation mode enabled the accessory 100 to act as an emulated card such as access control card or credit card and a NFC readers may read the data or credential that is stored in accessory 100. In the peer-to-peer mode, two devices may exchange data at link-level. This mode is standardized on the ISO/IEC 18092 standard. The controller 1121 may cycle through all the modes to meet all the scenarios of use. The controller 1121 may enable the first communication module 111 to receive the first credential from the host device 120. The first security element 1122 is coupled to the controller 1121 for storing the first credential received from the first communication module 111. The antenna 1123 is coupled to the controller 1121 as wireless frontend to wirelessly communicate with the first reader 131. The first storage unit 1124 may be used for storing data such as first transaction record or access record generated during the first activity. The data is transmitted from the reader and received by the controller 1121 though the use of antenna 1123.

On the other hand, the controller 1121 may be further used to receive the second credential from the first communication module 111, and the second credential is stored in the first security element 1122. The antenna 1123 further wirelessly communicates with the second reader 132 for a second activity by using the stored second credential.

The first credential may include certificates, security keys, PIN, user ID or password which are to be assigned or managed by a first server which managed by a bank or security service provider. The first credential is verified by the security service provider or bank server with the host device 120 wirelessly communicating to the security service provider or bank server. The second credential may include certificates, security keys, PIN, user ID or password which are to be assigned or managed by a second server which managed by another bank or security service provider. The second credential is verified by the second server with the host device 120 wirelessly communicating to the second server. The first reader 131 and second reader 132 may be credit card readers, access control reader or payment transaction reader. In other embodiment, the first credential and the second credential may be assigned by different security service provider or server such as American District Telegraph (ADT) Security Services and received by the host device 120. The first or second credential is verified by the corresponding first or second server with the host device 120 wirelessly communicating to the corresponding first or second server.

The verification of the credential may be under security infrastructure. One of the security infrastructures may be used is public/private key. When the host device 120 connects to a secure server such as the ADT Security Services server by using a baseband module of the host device, the host device 120 requests the server's credential, which includes the server's public key. The public key or credential may also be stored in the UICC (Universal Integrated Circuit Card) SIM card, memory card or virtual memory of the host device 120 by the network operator or the host device 120 manufacturer. When it gets the server's credential from the security service server, SIM card, memory cared or virtual memory, the host device 120 validates the credential based on its authenticity and expiry. The host device 120 then uses the credential it gets to generate its own private/public key pair and uses the public key from the server credential to encrypt the data to send to the server. At the end of this handshake, the host device 120 has the server's public key which used to encrypt messages sent to server, the host device public key used to send to the server and the host device private key used to decrypt messages sent by the server that are encrypted by the host device's public key. When the handshake is over, both the host device and the server are ready to communicate with each other over a secure channel. The first credential or the second credential which may include certificates, security keys, user ID or password is wirelessly transmitted to the accessory 100 and stored in the first security element. The accessory 100 is ready to have the credential to wirelessly communicate with the reader.

For example, when the accessory 100 wireless communicates with the first reader 131, the first reader 131 transmits a first identification information AID 1 or identification request to the contactless module 112. The controller 1121 receives the first identification information AID 1 or identification request through the antenna 1123, and selects the first credential which corresponding to the first identification information AID1 or identification request and wirelessly transmitting the first credential to the first reader 131 through the antenna 1123. If the first reader 131 is a door lock reader, the door can be opened by the accessory 100. When the accessory 100 wireless communicates with the second reader 132, the second reader 132 transmits a second identification information AID2 to the contactless module 112. The controller 1121 receives the second identification information AID2 through the antenna 1123, and selects the second credential which corresponding to the second identification information AID2 and transmits the first credential to the second reader 132 through the antenna module 1123. The first or second reader 131 or 132 may be coupled to the bank server or servers under secure infrastructure and verified the credential retrieved by the reader. Once the credential is verified, the payment transition between client and merchant is underway. The transaction record between the bank server, the merchant and the client may be recorded and transmitted to the accessory through connection between the reader and contactless module 112 of the accessory. The transaction record may be stored in the first storage unit of the accessory for transferring to the host device when the accessory and the host device are coupled to each other for exchanging data.

If the second reader 132 may be a second door lock reader, a second door can be opened by the accessory 100. In detail, for example, the host device may be a mobile phone or smartphone and a user may use the mobile phone to receive a second credential, and the second credential is used for opening a door. The mobile phone is configured to connect to an accessory 100, and the second credential may be transmitted from the mobile phone to the accessory 100. When the user needs to open the door, the user may place the accessory 100 in close proximity to a second reader 132 of the door, and the accessory 100 may transmit the second credential such as access code, PIN, the user ID and password in an encrypted form to the second reader 132 of the door. On the other hand, the second reader 132 may be coupled to a server via an internet access or other secure connection method such as virtual private network, VPN. The second credential received by the second reader 132 may be transmitted to the server under secure infrastructure, and the server may decrypt the received second credential and verify the second credential by comparing the credential with a standard data for generating a comparing result. The instruction may be transmitted to a switch of the door, and the door may be opened through the switch when the second credential is verified. The standard data may be pre-set or pre-generated data which associate with the second credential in the server before the second credential is transmitted to the user. The server may record the access of the door on the server or transmit to the accessory 100 through the second reader 132 and stored in the first storage unit of the accessory 100. The host device 120 may retrieve the access records on the server or from the accessory 100 by coupling the accessory 100 with the host device 120 and transmitting the access record from the first storage unit 1124 of the accessory 100 to the host device 120.

Figure 1D:
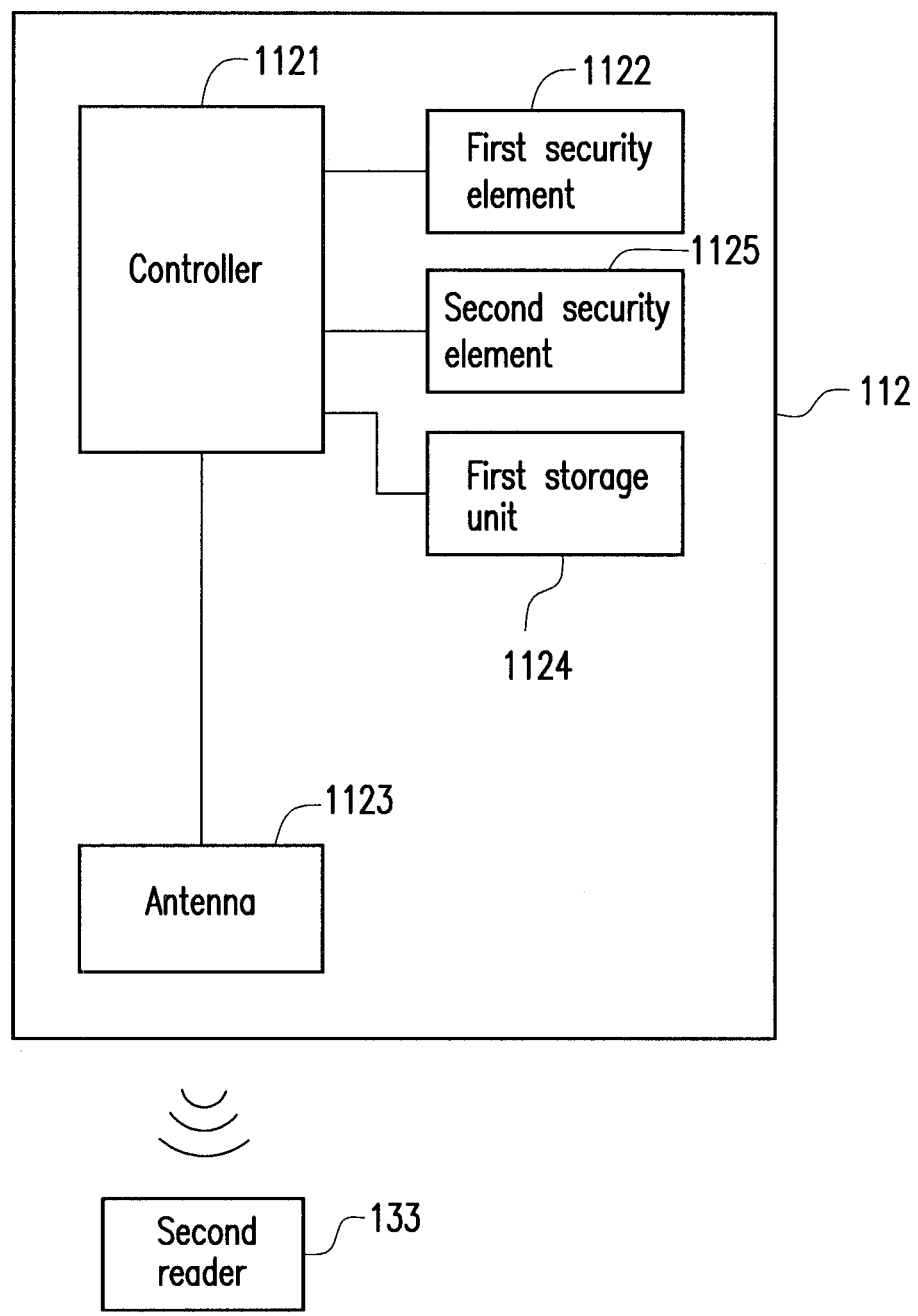
FIG. 1D is a block diagram of the contactless module 112 according to another embodiment of the present invention.

Please refer to FIG. 1D, FIG. 1D is a block diagram of the contactless module 112 according to another embodiment of the present invention. In FIG. 1D, the contactless module 112 further includes a second security element 1125. The controller 1121 may be coupled to many different security elements and the credentials may be stored in at least one of the security elements or the different credential may be stored in different security elements. The second security element 1125 is coupled to the controller 1121 for receiving a second credential, and the second credential may be received from the host device 120. In this embodiment, the antenna module 1123 is further configured to wirelessly communicate with a second reader 133. The first storage unit 1124 is further configured to store at least one second transaction record generated during the second activity.

Figure 2:
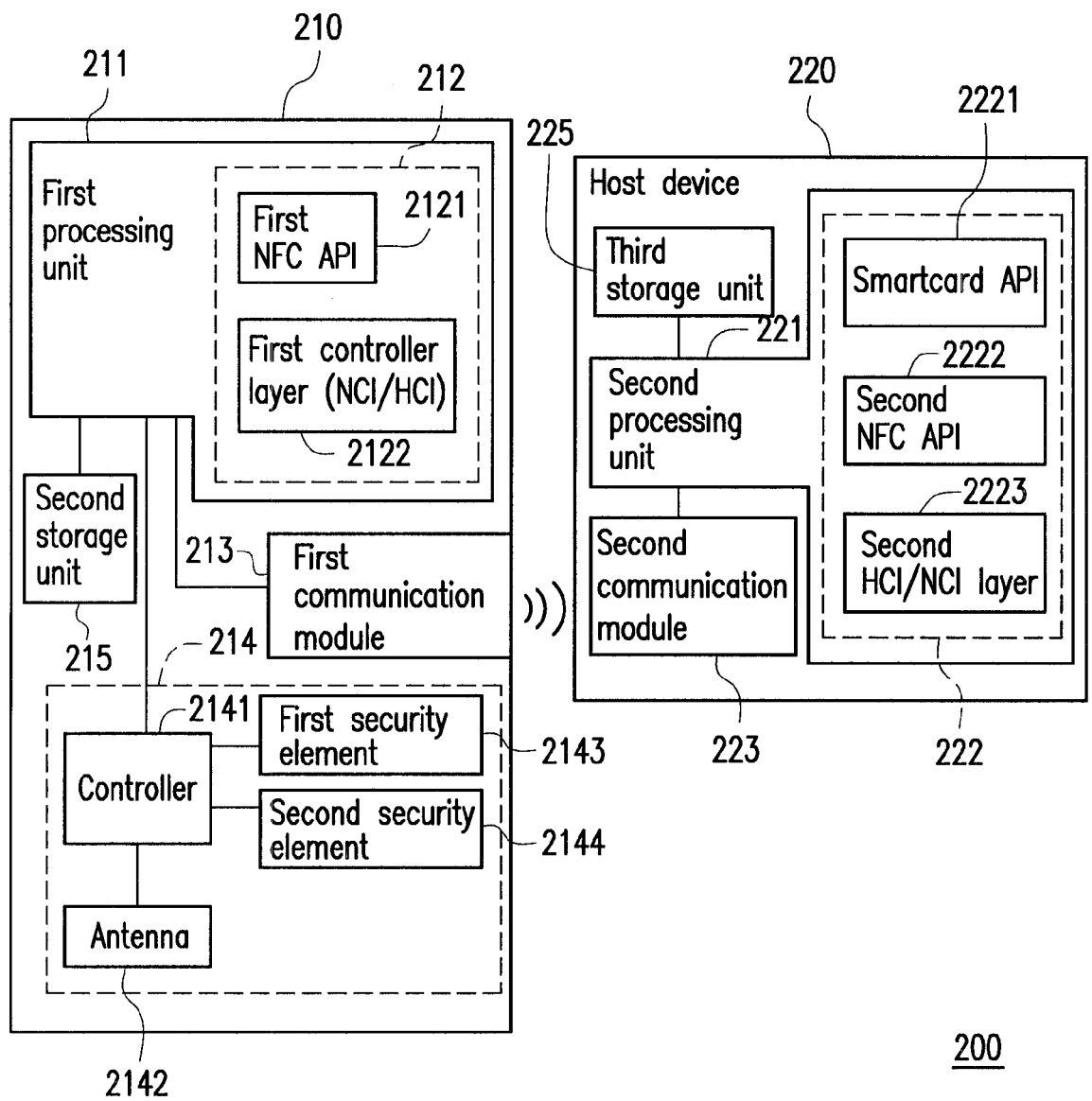
FIG. 2 is a block diagram of the system 200 according to an embodiment of the present invention.

Referring to FIG. 2, FIG. 2 is a block diagram of the system 200 according to another embodiment of the present invention. The system 200 includes an accessory 210 and a host device 220. The accessory 210 includes a first processing unit 211, a first communication module 213, and a contactless module 214. The contactless module 214 includes a controller 2141, an antenna 2142, and a first and second security element 213 and 2144, and a second storage unit 215. The controller 2141 may be a near field communication (NFC) controller and it is coupled to the first communication module 223 and the first processing unit 2114 by a host interface, such as Inter-Integrated Circuit (I2C), Serial Peripheral Interface Bus (SPI), and Universal Asynchronous Receiver/Transmitter (UART) interface. When the first communication module 213 receives the command or data from a second communication module 223 of the host device 220, the command or data is transfer to the first processing unit 211 and the host interface is used to communicate with the controller 2141 and the first or second security elements 2143 or 2144. For example, when the command of deactivate a credential stored in the first security element 2143, the command is transmitted from the second communication module 223 to the first communication module 213. The deactivation command is transferred to the first processing unit 211 and the host interface is used to communicate with the controller 2141. The controller 2141 receives the deactivation command and deactivates the credential stored in the first security element 2143. The data such as the transaction record may be received by the controller 2141 through the antenna 2142 from the first reader 131. The transaction record then is transmitted to the first processing unit 211 or the first communication module 213 through the host interface. The first communication module 213 is used to transmit the transaction record to the second communication module 223 of the host device when the host device 220 and accessory 210 are coupled. The first processing unit 211 may be running or processing a third application to communicate with the controller 2141 and a first radio communication software stack such as a first near field communication software stack to communicate with the controller and the first or second security element 2143 or 2144. Near field communication (NFC) is a set of standards for mobile phones and devices to establish radio communication with each other by touching them together or bringing them into close proximity, usually no more than a few centimeters. The first near field communication software stack is configured to communicate with the controller 2141 and the first or second security element 2143 or 2144 in the accessory 210. The third application may be a specific function that communicated with the first communication module 223 and the contactless module 214. The function may be receiving the transaction data from the antenna 2142 and stored in the second storage unit 215. The first radio communication software stack 212 such as a first near field communication software stack includes a first communication application programming interface (API) such as a near field communication application programming interface (NFC API) 2121 for communicate with the controller and a first host controller interface (NCI) layer 2122 for controlling the first communication module 213. When the first communication module 223 is a Bluetooth communication module, the first host controller interface layer may be a first Bluetooth host controller interface layer for controlling the Bluetooth communication module. For example, a command is issued to control the controller 2141 the command is encapsulated and formatted by the first near-field communication application programming interface (NFC API) for communicating with the controller 2141. Another example is the record stored in the second storage unit 215 is read and transmit to the first communication module 213 by the first processing unit 211. The record is encapsulated and formatted by the first near-field communication application programming interface (NFC API) 2121 and then encapsulated and formatted by first Host controller interface (NCI) 2122 for the first communication module 213 for transmitting the record to the second communication module 223. Furthermore, a third storage unit 225 is coupled to the second process unit 221 for storing the first credential.

Please refer to FIG. 2, the host device 220 comprises a second processing unit 221 and a second communication module 223. The second processing unit is coupled to the second communication module 223 and 221 may be running or processing an first application to manage the first and second credential stored on the first or second security element 2143 or 2144, and a second radio communication (NFC) software stack 222 such as a second near field communication software stack to communicate with the controller in the accessory 210. The first application may be an electronic wallet software program such as Google wallet, an electronic key software program, such as Seos Mobile Access. The first application may be configured to control the first security element and transmit multiple credentials to the first security element. A second application may be configured to control the second security element. The first application and the second application are independently configured to control different security elements. A command or data such as activation, deactivation, selection, installation or transportation of the credential in the first or second security element of the accessory may be initiated to manage the credential in the accessory and the host device. The command is transferred or passed over to the second radio communication software stack 222. The second radio communication software stack 222 includes a second application programming interface (API) such as a smart card API 2221 to interface with the first or second application, a second communication application programming interfaces such as a second near-field communication application programming interface (NFC API) 2222 for communicating the command or data between the controller and the second processing unit and a second host controller interface (NCI) layer 2223 for controlling the second communication module 223. When the second communication module 223 is a Bluetooth communication module, the second host controller interface layer may be a Bluetooth host controller interface layer for controlling the Bluetooth communication module. The application programming interface (API) is a specification intended to be used as an interface by software components to communicate with each other and it is used to describe the ways in which a particular task is performed, such as the format, number or types of the parameters to be passed to the functions and the type of the return value. The command is transferred to the first API and it is formatted and configured to communicate with the first or second security element. The second NFC API 2222 formats and encapsulates the formatted command for communicating with the controller in the accessory. Next the encapsulated command is then packaged by the NCI layer to control the second communication module for transferring the command or data to the first communication module. A wireless or wired connection is initiated between a first communication module in the accessory and the second communication module and the command or data is wirelessly or wired transmitted from the second communication module to the first communication module.

The first and second communication modules 223 and 213 are used to transmit or receive NFC package. The first and second communication modules 223 and 213 may be wired connected by using universal serial bus (USB) modules for connecting to each other via an USB cable. Besides, the first and second communication modules 223 and 213 may be wirelessly connected by using blue-tooth low energy (BLE) modules, blue-tooth (BT) modules or WiFi direct, a wireless LAN (WLAN) modules for wirelessly connecting to each other.

Figure 3:
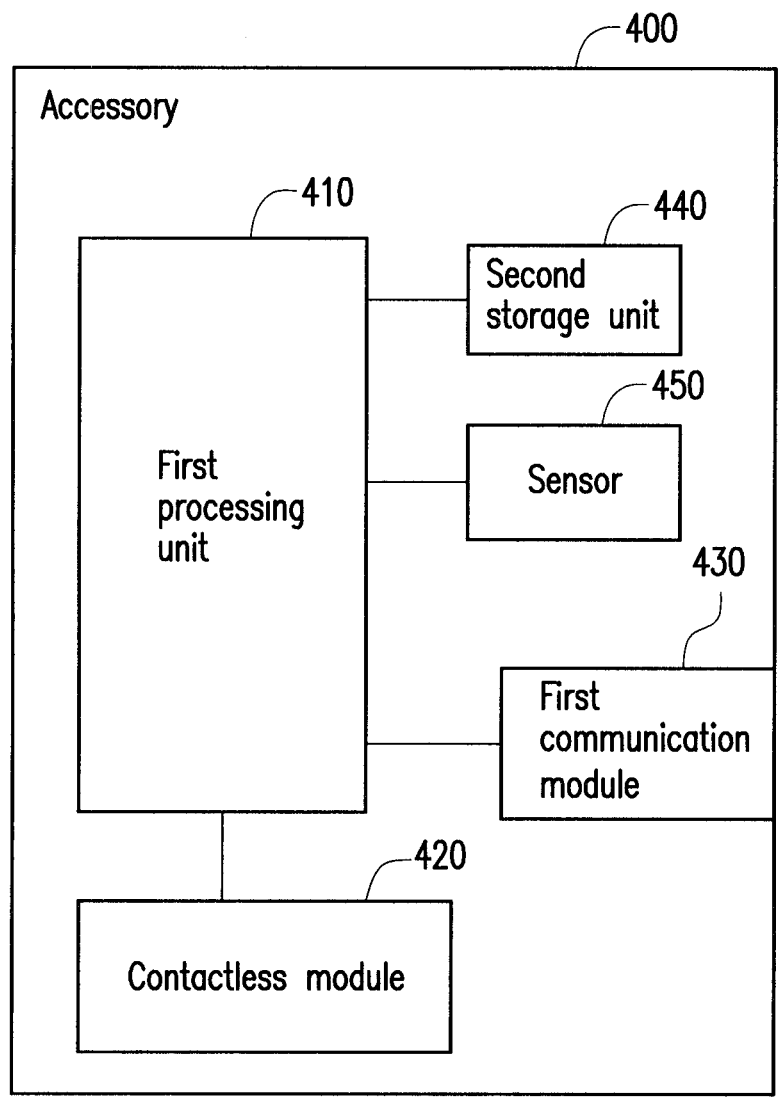
FIG. 3 is a block diagram of the accessory 400 according to an embodiment of the present invention.

Refer to FIG. 3, FIG. 3 is a block diagram of the accessory 400 according to an embodiment of the present invention. The accessory 400 may further includes a sensor 450 or sensors which coupled to the first processing unit 410. The accessory 110 may contain power supply (such as battery, not shown) to supply power to the modules and units in the accessory 110. The sensor 450 may be a temperature sensor, a gravity sensor (G-sensor), a heart rate monitor, a global positioning system (GPS), a compass, or a water-sensor. That is, the sensor 450 may be a sensor for measuring the physical energy related to the user or the environment that the user is situated. The situation may be as at least one of acoustic, sound, vibration, electric current, electric potential, magnetic, environment, weather, moisture, humidity, velocity, position, angle, displacement, distance, speed, acceleration, optical, light, imaging, photon, pressure, force, density, level, or thermal, heat and temperature. The sensor 450 can be composed of a plurality of sub-sensors, and the sub-sensors may be disposed in various places of accessory 400. Furthermore, the first processing unit 410 may read the sensing result from the sensor 450, and store the sensing signal to the first storage unit in the contactless module 420 or second storage unit 440. A reader may request a reading of the sensor and the first processing unit retrieves the sensing signal that the sensor senses and transmits to the controller for communicating the sensing signal with the reader. The accessory 400 may be paired with the host device, and the sensing signal stored in the first storage unit or second storage unit 440 may be transmitted to the host device 220. The host device 220 may analysis the sensing signal, or the host device 220 may transmit the sensing signal to a server for data analyzing via an internet by using the baseband module. Furthermore, if the host device 220 transmits the sensing signal to the sever for data analysis, the server may transmit an analyzed result to the host device via the internet. That is, the user may read the analyzing result through the host device (such as a mobile phone, smartphone, handheld device, tablet, server, or kiosk).

The first processing unit 410 may disable the first communication module 430 or the first communication module 430 is unable to connect to the host device. The accessory 400 is operating by itself. The controller may communicate with a reader by use of the antenna using credential stored in the first or second security element. The transaction records or access control records may be received by the antenna. The controller may transmit the records to the first processing unit 410 for storing in the second storage unit 440. The signal that the sensor 450 senses may be stored in the second storage unit 440. Therefore, the user may carry the accessory 400 for various activity or transaction without the need of the host device.

Figure 4:
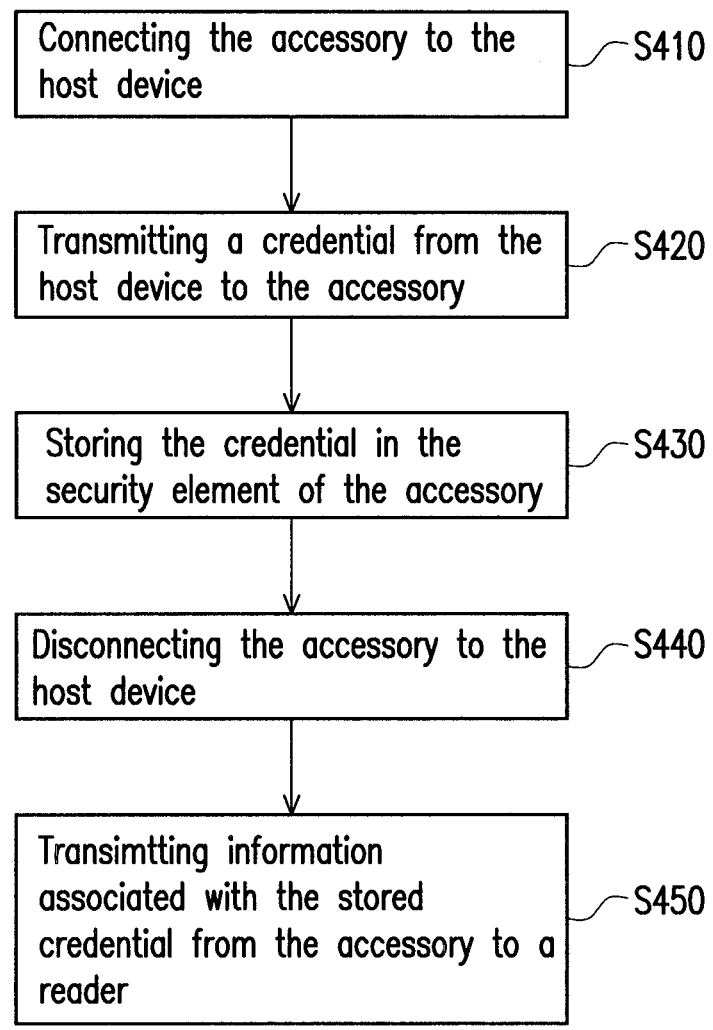
FIG. 4 is an example of flow diagram for a method for transmitting information between an accessory according to an embodiment of present invention.

FIG. 4 is an example of flow diagram for a method for transmitting information between an accessory according to an embodiment of present invention. Wherein, the accessory has a security element, and a host device, which is physically separated from the accessory. In step S410, the accessory is connected to the host device, and a credential is transmitted from the host device to the accessory in step S420. The credential is stored in the security element of the accessory in step S430, and the accessory is disconnected to the host device in S440. In step S450, information associated with the stored credential is transmitted from the accessory to a reader.

Figure 5:
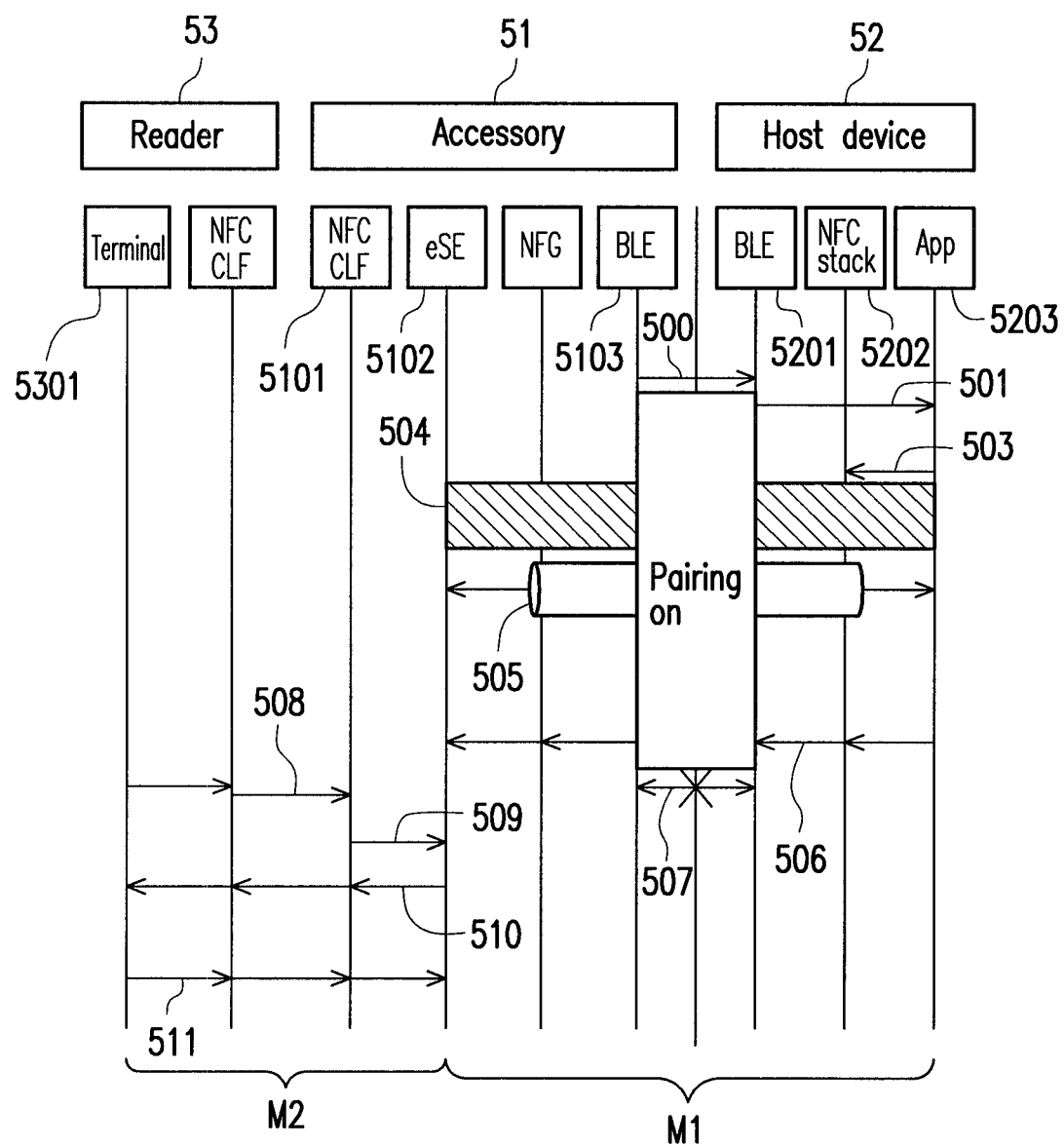
FIG. 5 is a flow diagram for the accessory and the host device according to an embodiment of present invention.

In detail, refer to FIG. 5, FIG. 5 is an example of flow diagram for the accessory and the host device according to an embodiment of present invention. In FIG. 5, in the pairing mode M1, a user may wirelessly couple the accessory 51 such as a payment card or a wristband to the host device 52 via a Bluetooth communication link 500. The Bluetooth communication link 500 is established between the Bluetooth low energy 5103 of the accessory 51 and the Bluetooth low energy 5201 of the host device 52. After success of communication link of the Bluetooth communication link 500 setup, the host device 52 triggers a signal to application 5203 to indicate the pairing by the step 501. The application 5203 would activate NFC stack 5202 via the step 503. The application 5203 then instructs NFC stack 5202 to establish a secure tunnel 504 between application and security element 5102, and the security element 5102 is such as embedded security element (eSE). The host device 52 would push a credential related to a first bankcard or credit card to the security element 5102 on the payment card (accessory 51) via the step 505. Next, the host device 52 activates the newly added credential on the security element 5102 via step 506. The user disconnects the payment card (accessory 51) from the host device 52 by tearing down the communication link in step 507.

After the step 507 is executed, the accessory 51 may operated in the stand alone mode M2, in which case the payment card is disconnected from the host device 52. When the accessory 51 coupled to the reader 53, the reader 53 establishes NFC connection with the payment card. The user may present the accessory 51 to be a payment card at POS (point-of-safe) and send the query for payment option by the step 508. Next, a NFC contactless frontend (NFC CLF) 5101 forwards the query to eSE 5102 via step 509. The eSE 5102 on the payment card send a list of activated card credentials via NFC to terminal 5301 via step 510. In this embodiment, the list contains the credential which was just installed on the eSE 5102. The terminal 5301 of the reader 53 authenticates the credential, accepts the card, and send the approval back to eSE 5102 via step 111.

In summary, the accessory is used to receive a credential from an host device when the accessory is coupled to the host device. When the accessory is disconnected to the host device, the accessory may provide the credential to a reader. In detail, the accessory includes a first communication module and a contactless module. The first communication module is used to communicate with the host device. The contactless module provides a security element to receive the credential from the host device through the second communication module. Especially, the credential in the accessory may be updated by the host device, and the accessory may be used to execute multiple functions.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. An accessory capable of connecting to a mobile host device, which is physically separated from the accessory, comprising:
   a communication module configured to wirelessly coupled to the mobile host device and receive a first credential from the mobile host device when the accessory is wirelessly connected to the mobile host device;
   a first processing unit coupled to the communication module; and
   a contactless module comprising:
      a controller coupled to the communication module and the first processing unit for receiving the first credential from the communication module;
      a first security element coupled to the controller for storing the first credential; and
      an antenna coupled to the controller;
   wherein, when the communication module is connected to the mobile host device, the first processing unit is configured to process a first radio communication software stack to transfer the received first credential from the communication module to the controller and when the communication module is disconnected from the mobile host device, the contactless module configured to wirelessly transmit information associated with the stored first credential to a first reader for a first activity.

2. The accessory according to claim 1, wherein the antenna wirelessly transmits information associated with the stored first credential to the first reader after the communication module is disconnect to the mobile host device.

3. The accessory according to claim 1, wherein the communication module is further configured to receive a second credential from the mobile host device, and the first security element is further configured to store the second credential and the antenna is further configured to wirelessly transmit information associated with the stored second credential to a second reader for a second activity.

4. The accessory according to claim 1, wherein the communication module is further configured to receive a second credential from the mobile host device, and the contactless module further comprises a second security element coupled to the controller for storing the second credential, and the antenna is further configured to wirelessly transmit the stored second credential for a second activity to a second reader.

5. The accessory according to claim 1, wherein the contactless module further comprises a first storage unit coupled to the controller and the controller receives a record related to the first activity from the first reader and stores the record to the first storage unit.

6. The accessory according to claim 1, further comprising the first processing unit coupled to the communication module and the controller and a second storage unit coupled to the first processing unit.

7. The accessory according to claim 6, wherein the contactless module further comprises a first host interface coupled with the controller for communicating between the controller and the communication module and the first processing unit.

8. The accessory according to claim 6, further comprising a sensor coupled with the first processing unit.

9. The accessory according to claim 8, wherein the first processing unit receives a sensing signal sensed by the sensor and transmits to the controller by processing the first radio communication software stack and the antenna transmits the sensing signal to the first reader.

10. The accessory according to claim 1, wherein when the communication module is externally disconnected from the mobile host device, the controller receives a record from the first reader and transmits the record related to the first activity to the first processing unit and the first processing unit stores the record in the second storage unit by processing the first radio communication software stack.

11. The accessory according to claim 1, wherein the first radio communication software stack comprises a first communication application programming interface for controlling with the controller and a first host controller interface layer to control the communication module.

12. The accessory according to claim 11, wherein the controller is a near field communication controller and the first radio communication software stack is a near field communication software stack and the first communication application programming interface is a near field communication application programming interface.

13. The accessory according to claim 1, wherein the communication module is a wireless communication module for connecting to the mobile host device.

14. A system comprising:
an accessory comprising a first communication module configured to receive a first credential and a contactless module, which comprises a controller coupled to the first communication module for receiving the first credential from the first communication module, a first security element coupled to the controller for storing the first credential, a first processing unit is coupled to the first communication module and the controller and an antenna coupled to the controller configured to wirelessly transmit information associated with the stored first credential to a first reader for a first activity; and
a mobile host device, physically separated from the accessory, comprising a second processing unit, a third storage unit coupled to the second process unit for storing the first credential, and a second communication module, which is coupled to the second processing unit for wirelessly transmitting the first credential to the first communication module when the accessory is wirelessly connected to the mobile host device, and a baseband module coupled to the second processing unit
wherein, when the first communication module is connected to the mobile host device, the first processing unit is configured to process a first radio communication software stack to transfer the received first credential from the first communication module to the controller and when the first communication module is disconnected from the mobile host device, the contactless module configured to wirelessly transmit information associated with the stored first credential to a first reader for a first activity.

15. The system according to claim 14, wherein the first communication module is further configured to receive a second credential from the mobile host device, and the first security element is further configured to store the second credential and the antenna is further configured to wirelessly transmit the received second credential for a second activity to a second reader.

16. The system according to claim 14, wherein the first communication module is further configured to receive a second credential from the mobile host device, and the contactless module further comprises a second security element coupled to the controller for storing the second credential, and the antenna is configured to wirelessly transmit information associated with the stored second credential to a second reader for a second activity; and wherein the mobile host device further comprises a baseband module coupled to the second processing unit and configured to wirelessly receive the first credential from a first server and to wirelessly receive the second credential from a second server.

17. The system according to claim 14, wherein the contactless module further comprises a first storage unit coupled to the controller and the controller receives a record related to the first activity from the first reader and stores the record to the first storage unit.

18. The system according to claim 14, wherein the accessory further comprises the first processing unit coupled to the first communication module and the controller and a second storage unit coupled to the first processing unit.

19. The system according to claim 18, wherein the first processing unit is configured to run the first radio communication software stack to communicate with the controller and the first communication module and the second processing unit is configured to processing a second radio communication software stack to communicate with the controller and the second communication module.

20. The system according to claim 19, wherein the first radio communication software stack comprises a first communication application programming interface for communicate with the controller and a first host controller interface layer for controlling the first communication module and the second radio communication software stack comprises an application programming interface, a second communication application programming interface for communicating with the controller and a second host controller interface layer for controlling the second communication module.

21. The accessory according to claim 20, wherein the controller is a near field communication controller and the first radio communication software stack is a first near field communication software stack and the first communication application programming interface is a first near field communication application programming interface and the second radio communication software stack is a second near field communication software stack and the second communication application programming interface is a second near field communication application programming interface.

22. The system according to claim 20, wherein the second processing unit processing a first application to manage the first credential stored in the first security element by processing the second radio software stack.

23. The system according to claim 19, wherein the contactless module further comprise a first host interface coupled with the controller for communicating between the controller and the first communication module and the first processing unit.

24. The system according to claim 19, further comprising a sensor coupled with the first processing unit.

25. The system according to claim 14, wherein when the first communication module is coupled with the second communication module, the controller receives a record from the first reader and transmits the record related to the first activity to the second communication module by using the first communication module and the second processing unit receives the record from the second communication module and stores the record in the third storage unit.

26. The system according to claim 18, wherein when the communication module is disconnected from the mobile host device, the controller receives a record from the first reader and transmits the record related to the first activity to the first processing unit and the first processing unit stores the record in the second storage unit by processing the first radio communication software stack.

27. The system according to claim 14, wherein the communication module is a wireless communication module for connecting to the mobile host device.

28. The system according to claim 14, wherein the host device further comprises a baseband module coupled to the second processing unit and configured to wirelessly receive the first credential from a first server.

29. A method for transmitting information between an accessory, which has a security element, and a host device, which is physically separated from the accessory, comprising:

activating a first radio communication software stack by the mobile host device;

establishing a secure channel between an application of the mobile host device and the security element by using the first radio communication software stack;

wirelessly transmitting a credential from the mobile host device to the accessory via the first radio communication software stack, storing the credential in the security element; and wirelessly transmitting information associated with the stored credential from the accessory to a reader when the accessory is disconnected from the mobile host device.

30. The method of claim 29 wherein transmitting the credential stored in the security element to the reader includes receiving an identification information from a reader, selecting the credential from the security element which corresponding to the identification information.

31. The method of claim 29 wherein transmitting the credential stored in the security element to the reader includes receiving a data from the reader, storing the data in the accessory.

32. The method of claim 31 wherein storing the data in the accessory includes processing the first radio communication software stack in the accessory to store data in the accessory, transmitting the stored data to the mobile host device from the accessory by processing a second radio communication software stack.

33. The method of claim 29 wherein transmitting the credential stored in the security element to the reader includes receiving a data from the reader, transmitting the data to the host device from the accessory.

34. The method of claim 29 further comprising coupling the host device with a server, receiving the credential from a server, verifying the first credential with the server.

* * * * *